INFORMATION RETRIEVAL AND STORAGE SYSTEMS

Filed Dec. 30, 1957 3 Sheets-Sheet 1

INVENTOR
Peter James
BY Pennie, Edmonds, Morton, Barrows & Taylor

INFORMATION RETRIEVAL AND STORAGE SYSTEMS

Filed Dec. 30, 1957 3 Sheets-Sheet 2

Peter James
INVENTOR.

BY Pennie, Edmonds, Morton, Barrows & Taylor

INFORMATION RETRIEVAL AND STORAGE SYSTEMS

Peter James
INVENTOR.

BY Pennie, Edmonds, Morton, Barrows & Taylor

United States Patent Office 3,075,178

Patented Jan. 22, 1963

3,075,178

INFORMATION RETRIEVAL AND STORAGE SYSTEMS

Peter James, Yorktown Heights, N.Y.
(1934 Rosemary Hill Drive, Silver Spring, Md.)

Filed Dec. 30, 1957, Ser. No. 706,166
8 Claims. (Cl. 340—172.5)

This invention relates to systems for automatically registering, sorting, selecting, retrieving, computing, comparing, effecting other similar machine operations, and recording or storing various forms of information onto a media for storing unalterable and alterable data to accomplish an improvement in mechanized research.

In particular it relates to information retrieval and storage systems and data processing systems utilizing media with a track for the storing of unalterable data or information such as photographs, perforated tape or cards, or other similar forms of unchangeable information such as decisions of law cases, longhand writing specimens, pictures, finger prints, etc., and for the storing of alterable data or information on a magnetic track beside or proximate to and related in some way to the unalterable data. The data processing system of the invention sequentially selects certain alterable data on a medium with its related unalterable data in response to remotely registered data similar to the alterable data, and delivers at least one duplicate set of alterable and unalterable data on another medium as it is selected.

In the field of legal research, for example, there is a substantial amount of material consisting of court decisions, statutes, treaties, opinions of regulatory commissions. These are herein generally referred to as "documents." These documents, usually consisting of several pages or sheets of material, are often modified in effect by other later documents which must be also indexed into the source material. Although some of these documents are simple in scope, others contain a plurality of interrelated facts and issues as well as complex points of law. Another factor in legal research is that of completeness within the limits of time and human frailty and fatigue, as well as the item of cost in performing the research and procuring copies of relevant material. Therefore, the mechanization of legal research, or any other research, in accordance with the features of the invention, enable the research to be done rapidly at a low cost within a short time as well as obtain copies of all relevant documents pertaining to the precise interrelated points of the search.

Therefore, merely for the purpose of illustration, the invention will be described with respect to a data processing system having media for the storing of law cases, decisions, or statutes that are subject to being frequently treated in more recent decisions, and legislation that follow, harmonize, limit, overrule, etc., the earlier cases, decisions or statutes that are stored on the media. The data processing system utilizes the changes in data by storing the changed data on the magnetic track of the media adjacent a photographic print of the specific case, decision or legislation that is effected. When search for certain data is required, the data processing system is able to select data from the media according to a predetermined code, and record at least one duplicate set of magnetic and photographic data on a sensitized receiving media.

A number of selective photographic data or other information processing systems have heretofore been proposed. One general feature of these systems is that there is provided alongside of the photographic data on a medium, a coded area that is related to the particular photographic data. The coded area is positioned adjacent the photographic data in either a longitudinal or transverse location with respect to photographic data on the medium. These systems also generally provide for the projection of selected photographic and coded information onto sensitive media for use in the manner and purpose selected. Systems of this description are disclosed in patents to Richard S. Morse, No. 2,295,000, and Ralph R. Shaw, No. 2,594,358.

As more specifically described in the above patents, a principal code and document record is employed from which is derived, by the use of appropriate apparatus, a selected code and document record having portions of the principal record reproduced onto a sensitized receiving medium providing, in reproduced form, all the information from the principal record that is essential or necessary for the selected use. In these prior art systems, there is no provision for recording a selected code and document record with a predetermined change in the coded information of the principal record.

With the application of these prior art systems to a system characterized by recording of repetitive changes in interpretations, constructions and scope of usage of a particular document on the principal record, the prior art systems have the disadvantage of not being able to select conjointly an unalterable and alterable record and then produce conjointly at least one copy of the unalterable and alterable record. Moreover, such prior art systems require expensive, complicated, non-versatile and time-consuming apparatus to perform even the simplest of these operations.

It is a primary feature of the present invention to provide a system which may prepare single or multiple copies of records containing unalterable forms of selected information identical with portions of a principal record and alterable forms of coded information of the principal record modified by coded information introduced into a programmer device by an operator or by other means.

Another object of this invention is to provide means for modifying a stored magnetic code on a record due to revision of the original code, and means for selecting desired portions of the magnetic code for storing on another record.

A further object is to provide means for changing or delivering desired information related to a photographic record, in accordance with digital information recorded in the record, or registered in a programmer or other device external of the record.

Other objects and features of the invention will be in part pointed out, and in part be evident, in the discussion of the specific embodiments hereinafter given.

The invention will be further described with reference to the following description of specific embodiments thereof, taken in conjunction with the drawings in which.

Figure 1:
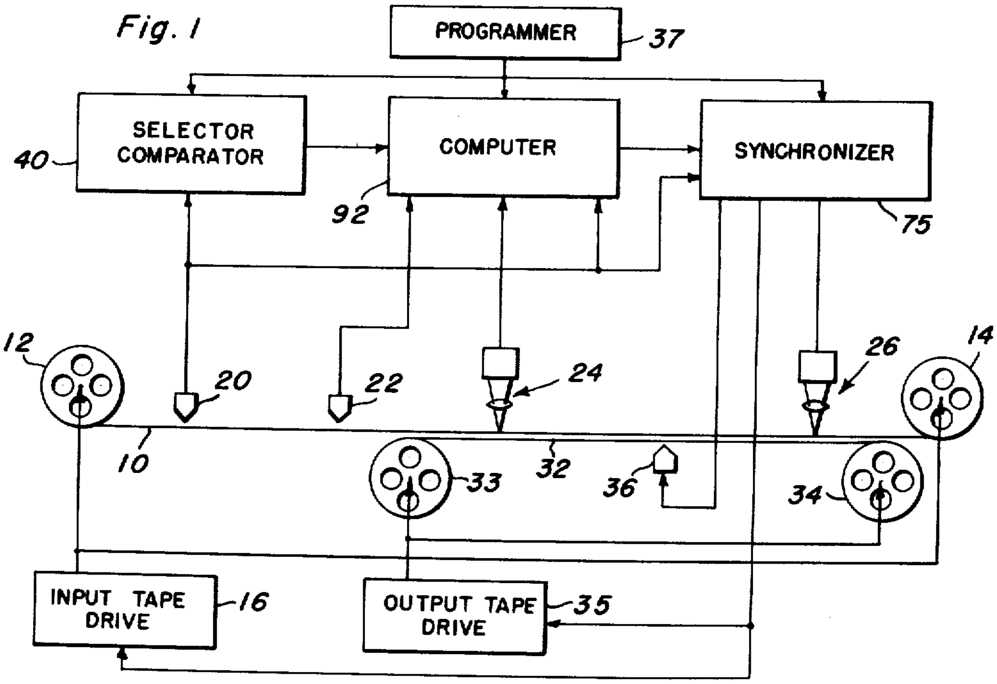
FIG. 1 is a block and schematic diagram illustrating the elements of a preferred embodiment of the invention.
Figures 1A, 3:
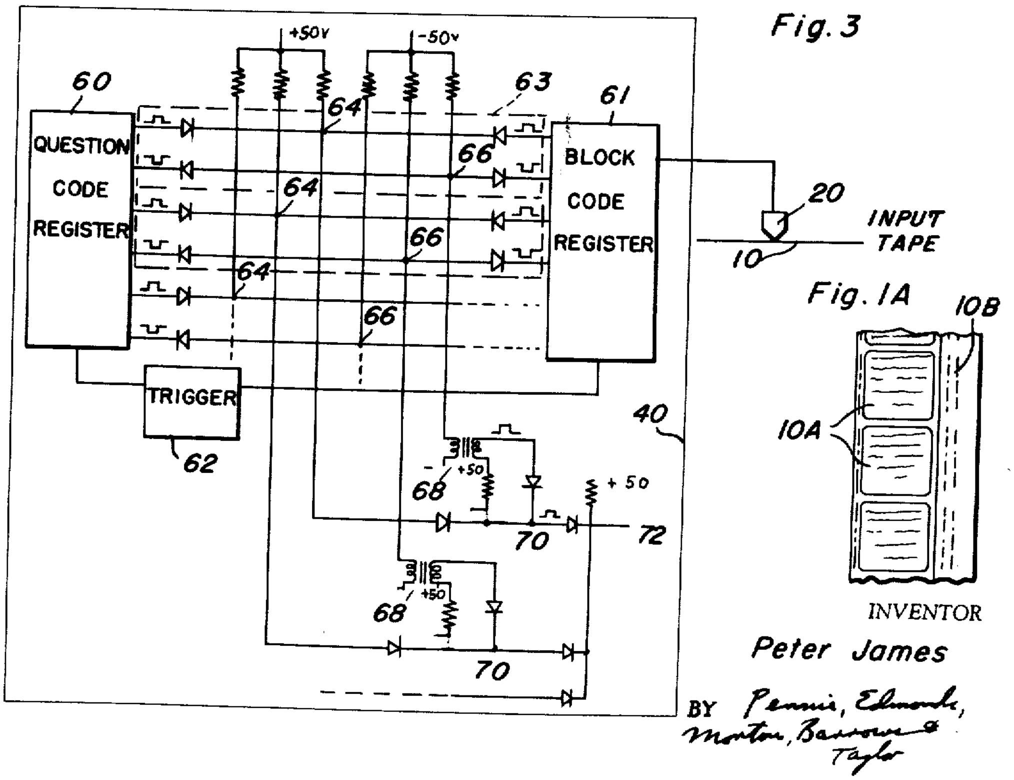
FIG. 1A is a diagram illustrating the photographic and magnetically coded data sections of an input tape.
FIG. 3 is a detail block and schematic diagram of an asynchronous selector comparator which alternatively may be used in the system of FIG. 1.

Referring now to FIGS. 1 and 1A an input storage medium or tape 10, containing photographically recorded information 10A such as a print of a decision in a law case, and magnetically coded information 10B representing coded data concerning the law case in at least one distinct portion or track of the tape, is wound on reels 12 and 14. The photographic and magnetic information is shown as being divided into groups or blocks of equal size. An input tape drive 16, moves the input tape 10 in a forward direction toward the reel 14, although the tape can be reversed in movement so that it is taken up by reel 12. As the tape moves along its path between the reels 12, 14, it passes by several translation units identified as magnetic, selector or input read-write unit 20, modifying read-write unit 22, photoelectric unit 24, and a gaseous discharge lamp unit 26 having a lamp similar to those used in high speed photography.

Figure 2:
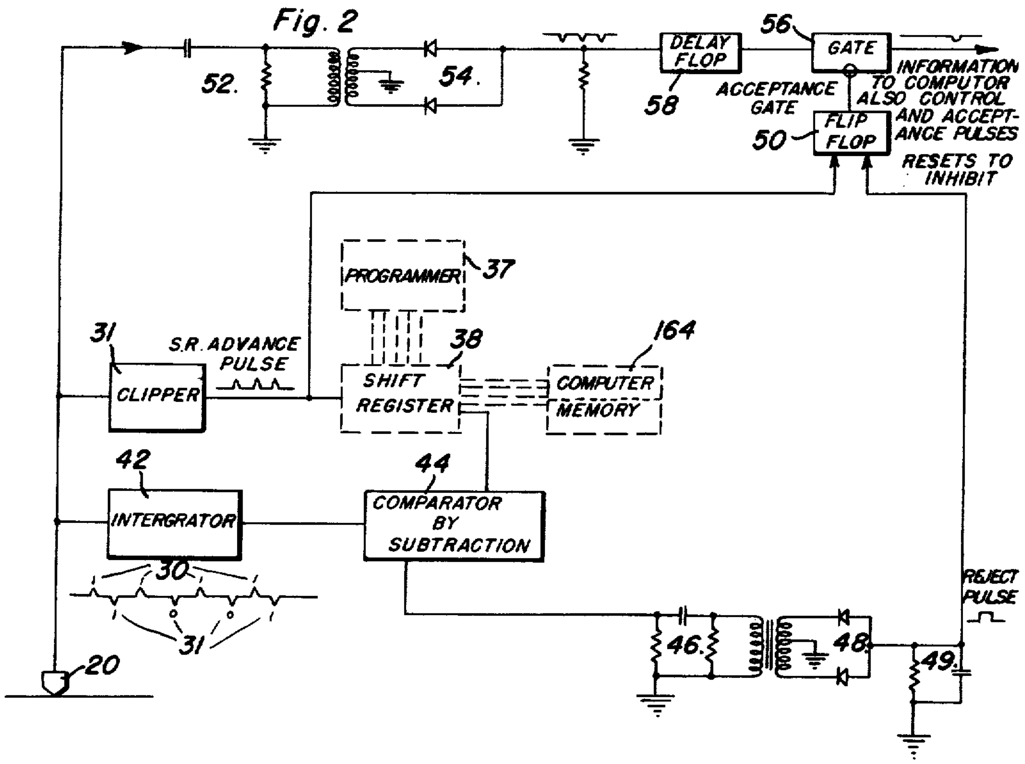
FIG. 2 is a detail block and schematic diagram of a synchronous selector comparator which may be used in the system of FIG. 1.

As shown in FIG. 2 the magnetic information on the tape is scanned by the selector read-write unit 20, which unit generally may be of a form to develop marker pulses 30, each followed by spacially oriented digital signal pulses 31. These signal pulses 31 represent various forms of code or information relating to the adjacent photographic information. The signal pulses 31 after integration, substantially correspond to and later are compared with an interrogatory key or question code or data developed in a manner described below, and may be referred to as the question-answer code from the input tape. The latter portion of the signal pulses are the answer code and represent the answer to the question code as well as other information relating to the adjacent photographic data.

Again referring to FIG. 1 the photographic information on the tape is scanned by the photoelectric unit 24 to derive from the photographic information on the tape the lengths or numbers of photographic pieces or bits of information for use with other signals to be developed in the system. The photographic information on the input tape 10 is used to record selected photographic documentary information on a sensitized receiving medium or output tape 32 when a lamp unit 26 is energized. The output tape is wound on and fed from the reel 33 and taken up on reel 34. The output tape is driven by the output tape drive 35.

A programmer unit 37 receives information from an operator in the form of a question which is to interrogate the input tape. The question is introduced into the programmer by a keyboard or similar arrangement to produce signals in a shift register 38 of conventional construction. These signals are herein referred to as a "question code" from the programmer. The shift register 38 develops code pulses for each bit of information of the question for comparison with the pulses from the selector read-write unit 20 by the selector comparator 40.

While there are numerous ways of arranging magnetically coded information on a tape, of developing a pulse code from a shift register, and of comparing the two forms of codes, one of two forms of code comparison provide for the comparison of the bits of the code synchronously, i.e., serially bit by bit as received, as shown in FIG. 2 and another to provide for the comparison of all the bits of the code asynchronously, i.e., assembling serially, and then comparing in parallel as disclosed in FIG. 3.

In the form of the invention shown in FIG. 2 utilizing a synchronous selector comparator 40, a series of pulses comprise a code wherein corresponding positions thereof relate to the same bit of information. The question code from the programmer 37 stored in the shift register 38 and a similarly oriented code developed by the read-write unit 20 from the magnetically coded track on the tape 10 is preceded by marker pulse 30. The question code pulses from unit 20 are pased through an integrator 42 and onto a comparator 44. The coded pulses also pass to the shift register 38, and after being clipped of the signal pulse 31 by clipper 31, the pulse causes the shift register to advance the question code to the comparator 44. Each pulse of the question code is compared with the corresponding bit of the tape code. If there is complete correspondence of the tape question code with the question code from the shift register derived from the programmer, no pulse output will appear from the comparator. If there is a difference between the code pulse elements, either a positive or negative pulse will appear at the output of the comparator and will be differentiated by capacitance-resistance network 46 and converted to positive pulses by rectifier arrangement 48 regardless of the polarity of the pulses from the comparator. These pulses are summed by smoothing network 49 to form a rejection signal or pulse which is coupled to reset a flip-flop 50 initially set by pulses from clipper 31. The tape question and answer code is passed from the selector read-write unit 20 to a differentiating unit 52 and rectifying network 54 so that negative pulses are developed from the tape code. These negative pulse signals are applied to a gate 56 through a conventional shifting register or delay flop device 58, which causes the negative pulse to wait until there is no possibility of a rejection pulse being produced from networks 46—49 during the time the question code is being prepared. The gate 56 will pass one of the negative pulses if no rejection signal is applied to the gate since flip-flop 50 is set to open the gate 56, but if a rejection pulse is developed no negative pulses are passed, because flip-flop 50 is reset by the rejection pulse to inhibit or close the gate to prevent the gate from passing a negative pulse. The negative pulse that passes the gate 56 is used as a "control" or "acceptance" pulse in other units of the system, and is so identified.

The asynchronous selection of question code and magnetic tape code for difference comparison, shown in FIG. 3, includes a question code register 60 and a block code register 61, of conventional shift register types provided with means for converting marks from the tape or programmer into positive pulses and for converting spaces from the tape or programmer into negative pulses. In every case of coincidence, a pulse is produced, and any failure of a component to produce a pulse results in the absence of a pulse in the output. In this manner it is possible to obtain positive comparison of coded information of the question code register 60 and the block code register 61. This positive comparison is in the form of an acceptance pulse to be described below. Both the question code register and the block code register store the information until a trigger unit 62, which is responsive to the receipt of tape question code, causes all the bits of the question code to be simultaneously compared with corresponding elements of the tape question code by means of multiple sets of input "and" gates 63. Each of the sets receives positive pulses and negative pulses from the code registers 60, 61 representative respectively of marks and spaces of the said registers. If the corresponding bits coincide in polarity, a positive pulse appears at connection 64, and a negative pulse appears at connection 66. The pulses at 66 are inverted in polarity by pulse transformers 68 and compared with the corresponding positive pulse at connection 64 by an "or" gate 70. Thus, if either a positive or negative pulse coincidence appears, a positive pulse is produced by gate 70. All the pulses from the registers 60 and 61 are similarly compared by means of a multiple input "and" gate such that if every code element is matched, a pulse appears at connection 72. The appearance of the output pulse at 72 at the time of the trigger is used to signal the selection of the particular tape question code and is referred to as an acceptance pulse.

The absence of a pulse at 72 causes the tape question and its adjacent photographic information to be rejected.

A synchronizer 75 is used to control the transfer of photographic data from the input tape to the output tape as well as the transmittal of the tape question-answer code to the magnetic portion of the output tape. In any installation the number of magnetic information blocks between the selector read-write unit 20 and the lamp unit 26 is determinable by calculating the number of magnetic photographic information blocks of frames on the tape that exists between the input and output read-write units.

Figure 4A:
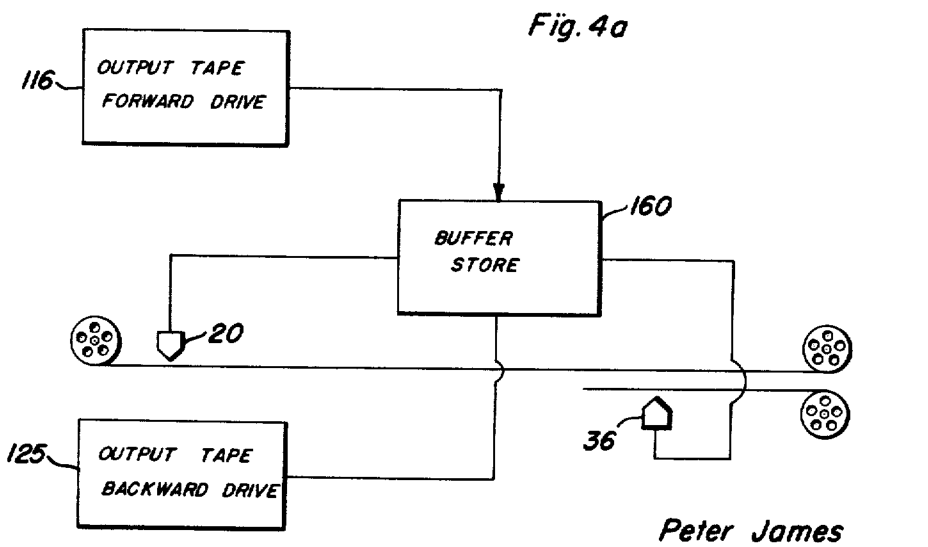
FIGS. 4 and 4A are a detail block diagram of portions of the synchronizer shown in FIG. 1.
Figure 4:
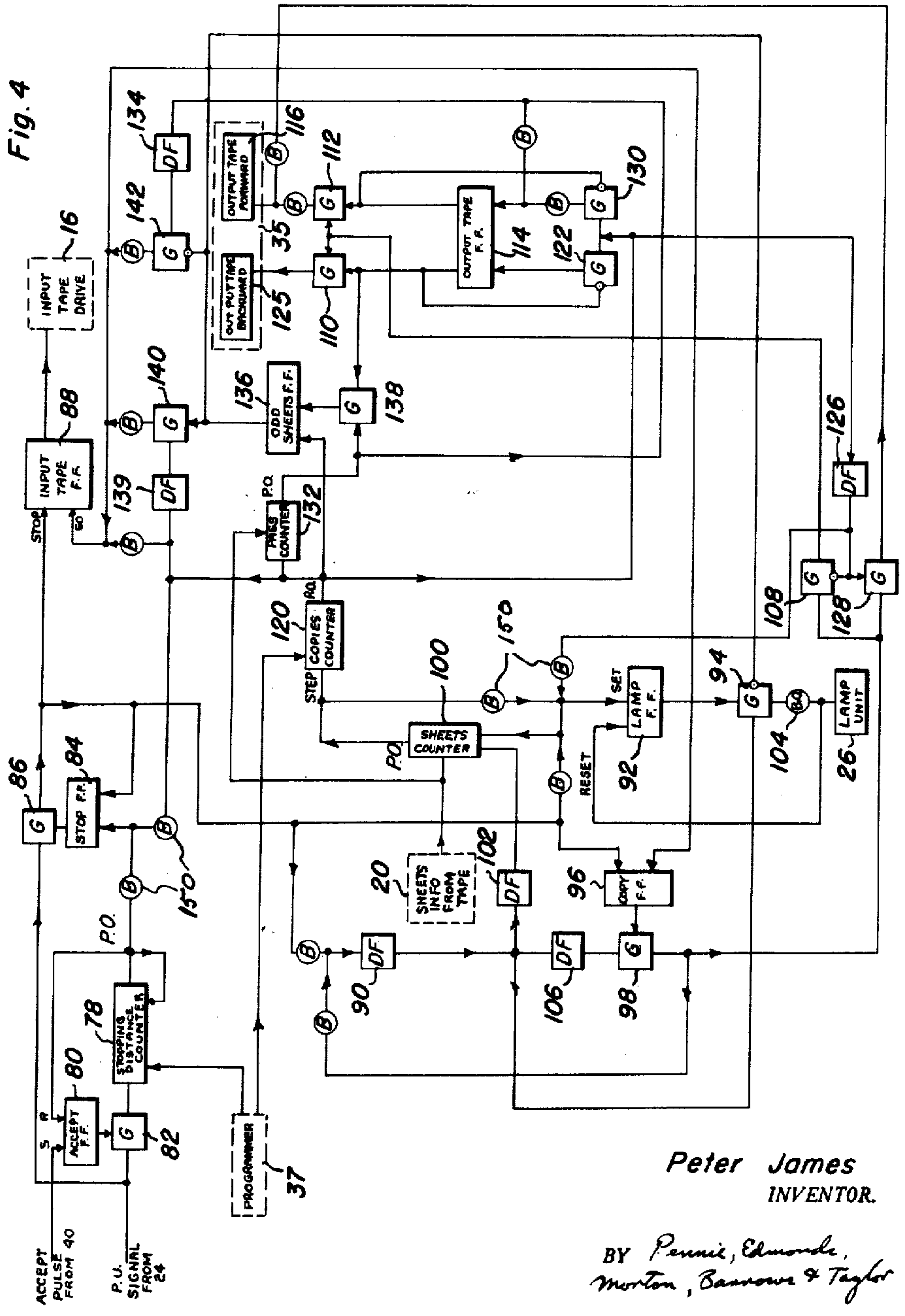

The programmer sends a signal representing this number of frames into a predetermined counter or stopping distance counter 78, FIG. 4, of conventional type.

The stopping distance counter 78 is preset from the programmer 37 and the acceptance pulse derived from the selector comparator 40 is used to set an acceptance flip-flop 80 and open a gate 82. As the input tape is advanced to travel toward the lamp unit 26, the photoelectric unit 24 detects the passing of the edge of each frame and sends an "edge of frame" pulse for each passing frame to the stopping distance counter 78 through the open gate 82 if the gate has been opened by an acceptance pulse from the selector-comparator when the number of pulses from the photoelectric unit equal the number preset by the programmer in the stopping distance counter, the stopping distance counter produces a preset output pulse which clears the stopping distance counter back to zero, resets the acceptance flip-flop 80 to its reset condition, thus closing gate 82, and sets a stop flip-flop 84, which opens a gate 86. The preset output pulse is shown throughout FIG. 4 as *"p.o."*

Since the gate 82 is now closed, the next "edge of frame" pulse received by the acceptance flip-flop 80 from photoelectric unit 24 will not pass therethrough, but passes through gate 86 to an input tape control flip-flop 88 which causes the movement of the input tape to stop by coupling a signal therefrom to the input tape drive 16. The same "edge of frame" pulse passing through the gate 86 also (1) resets the stop flip-flop 84, thereby closing gate 86 to the passage of subsequent pulses from the photoelectric unit 24, (2) triggers a univibrator or delay flop 90, (3) sets a lamp flip-flop 92 to open gate 94, and (4) sets a copy flip-flop 96 to open a gate 98.

When delay flop 90 produces its pulse after the predetermined delay, or as termed in the art, when delay flop 90 recovers, the recovery pulse steps a "number of frames or sheets" counter 100 one digit after passing through an additional delay device 102 if required. The same pulse from delay flop 90 also (1) passes through an open gate 94 to trigger a blocking oscillator 104 which energizes the lamp in the lamp unit 26, this, in turn, resets the lamp flip-flop 92 to its initial condition, closing gate 94 and extinguishing the lamp of lamp unit 26, and (2) triggers a record delay flop 106.

The recovery pulse from the delay flop 106 passes through the open gate 98 and retriggers the delay flop 90. Also, the recovery pulse passes through a normally open gate 108 to sample gates 110 and 112. Presupposing that an output tape control flip-flop 114, having just two conditions of stability which operate to open either of the gates 110 or 112, has opened the gate 112, then the pulse passing through the gate 108 passes through the open gate 112 and produces a signal in an output tape forward drive 116 which moves the output tape forward for a distance of one frame.

The circuit path including delay flop 90, delay flop 106 and gate 98 continues to carry a cycle pulse that repeats the above step of concurrently advancing with each cycle the "number of sheets" counter 100 and the output tape by the signal applied to the output tape forward drive 116. The "number of sheets" counter 100 has been preset by information on the input tape as part of the answer code describing the number of sheets or frames to a particular document set, all of which frames it is desired to reproduce in sequential arrangement on the output tape. Hence, it will be seen that the output tape moves the distance covered by the number of sheets set in the "number of sheets" counter 100, which counts the distance for each sheet, but that only the first frame of the output tape has been exposed. When the count of the "number of sheets" counter 100 is completed, it produces a preset output to (1) step a "number of copies" counter 120, (2) clear or reset the "number of sheets" counter 100, and (3) set the lamp flip-flop 92 to open the gate 94. The next pulse from delay flop 90 as it progresses in recycling causes the lamp to be energized and expose a portion of the output tape to the corresponding frame of the input tape.

The "number of copies" counter 120 is not a counter set by information derived from the programmer 37 and controls the number of copies of the set of sheets of the document that are desired to be exposed onto the output tape.

The action of exposing portions of the output tape separated by other sheets of the document to frames of the input tape, continues until the "number of copies" counter 120 has counted off the required number of copies and produces a preset output.

The present output pulse of the "number of copies" counter 120 is used to (1) set the input tape control flip-flop 88 to a condition providing for the input tape drive 16 to be in the "go" position, (2) set the stop flip-flop 84 to open the gate 86 for passing an "edge of frame" pulse to cause the input tape to advance the distance of one frame, (3) pass a pulse through a gate 122 to set the output tape control flip-flop 114 to open the gate 110 to permit the passage of a pulse to the output tape backward drive 125, so that the output tape will move backward when a pulse is passed through the gate, and (4) trigger delay flop 126, the recovery pulse of which is used to close the gate 108 and to open gate 128 so that the cycle pulse from the gate 98 passes through the gate 128 instead of the gate 108 as heretofore, thus causing the output tape to advance forward one frame for each cycle pulse by directly pulsing the output tape forward drive 116. The recovery pulse from delay flop 126 also triggers the lamp in the lamp unit 26 thus exposing the output tape to the second frame on the input tape.

After the recovery pulse from the delay flop 126 is dissipated, the gate 108 is no longer closed and gate 128 is no longer open so that again the recycle pulses from gate 98 pass through the open gate 110 to the output tape backward drive 125 for moving the output tape in a backward or reverse direction; similarly the lamp unit will expose separate portions of the output tape to the second frame of the document.

When the "number of copies" counter 120 has counted the number of pulses corresponding to the number of copies to be made of the second frame on the output tape, it produces a preset output which passes gate 130 and sets the output tape control flip-flop 114 again to open the gate 112 for passing a pulse to the output tape forward drive 116 to move the output tape in the forward direction, and in this manner the third frame of the document is exposed onto the output tape at predetermined positions, similarly to the first and second sheets of the document.

The action explained thus far continues and the odd sheets of the document are exposed onto the output tape as it moves in the forward direction, and the even sheets are exposed onto the output tape as it moves in the reverse or backward direction, except for the first exposure of each even series because it is exposed onto the output tape as it moves in the forward direction as explained above. Each preset output pulse from the "number of copies" counter 120 steps a "number of passes" counter 132 which was initially set from the same information from the input tape as the "number of sheets" counter. Counter 132 will always be set to count an odd number since the number of passes is an odd number. If an even number of sheets are in the document set, the even number plus one is counted; if an odd number of sheets are in the set, the odd number of passes of the output tape across the lamp unit are counted.

When the "number of passes" counter 132 reaches the preset number, a preset output pulse therefrom triggers delay flop 134, which allows time for an "odd number of sheets" flip-flop 136 to be set. The "odd number of sheets" flip-flop 136 will be set if the output tape is moving in a backward direction by a pulse passing a gate 138 opened by a pulse from output tape control flip-flop 114 to pass the preset pulse from the "number of passes" counter 132. The action of the "odd number of sheets" flip-flop 136 is to close the gate 94 so that as the output tape moves forward again, the lamp unit will not be energized.

When the last or final preset output pulse from the "number of copies" counter 120 resets the "odd number of sheets" flip-flop 136 and passes through a delay flop 139 to open a gate 140, a pulse from "odd number of sheets" flip-flop 136 passes through the open gate 140 to reset the copy flip-flop 96 and give a "go" signal to the input tape for continuing the search for the next document that is to be selected by the comparator and reproduced. If the "odd number of sheets" flip-flop 136 is not set, the recovery pulse of delay flop 134 passes gate 142 to become the final "go" pulse to reset the copy flip-flop 96 and set the input tape control flip-flop 88 in its "go" condition for providing continuous forward movement to the input tape to search for the next document that is to be selected by the selector comparator.

Throughout FIG. 4 there are shown in various parts of the circuitry, buffers 150. These are isolating circuits having a vacuum tube or crystal diode used chiefly to prevent undesirable interaction between two or more connected circuits.

While the block diagram of FIG. 4 shows an arrangement for exposing the output tape to selected portions of information on the input tape, an arrangement for substantially simultaneously writing magnetic information onto the same portion of the output tape in accordance with the information on the input tape may be accomplished by any of several methods, one of which is illustrated in FIG. 4A. Referring to this figure the magnetic information on the input tape is picked-up by read-write unit 20 and passed to a buffer store 160 preferably of the shifting register type. A shifting register, as is known in the art, has the ability to accumulate digital information such as a train of pulses for storage, and, upon the actuation of one of two signal pulses, will release the digital information from the register in the same forward orientation of the pulses, or the reverse orientation of the pulses, depending upon which of the two actuation signal pulses were applied.

The buffer store is actuated by a pulse either from the output tape forward drive 116 or the output tape reverse or backward drive 125. Output tape control flip-flop 114 prevents both of these drives 116 and 129 from actuating the buffer store simultaneously. The information, as it is released from the buffer store, is passed to the output read-write unit 36 so that the magnetic information recorded on the tape at a position adjacent to or otherwise related to the photographic information that was exposed onto the output tape is in the same order as it was taken from the input tape, regardless of the direction in which the output tape is moving.

In this manner, with the apparatus described, it is possible to select a document having several sheets recorded as separate frames on an output tape and to produce a copy of the document as a set of single sheets, or it is possible to produce a plurality of copies of the selected documents along the output tape in any pre-programmed distribution or array, each document containing the complete number and arrangement of sheets.

The computer-memory 164 in the computer 92 is a computing machine data receiver which is able to perform simple logical machine operations such as adding, subtracting, counting, sorting, comparison, collating, and other machine programming functions for providing suitable signals, codes, or pulses at predetermined times, but in the present invention it principally is used to store coded data on conventional magnetic tapes, cores or drums. For instance the counting function is available so that counter 120 may control the number of copies run off on the output tape. It may be a general condition that only a single copy of any recorded data is desired, so normally the counter will receive the set pulse at the end of the recording of the question-answer code. To perform these various operations in accordance with predetermined signals, the modifying read-write unit 22 is provided. This unit may be used to change and update the information that is read by selector unit 20 in the same way as output read-write unit 36 accomplishes the function of writing a code from a conventional shift register onto the output tape. The computer-memory 164 may also receive and use information developed from a photographic characteristic of the tape, as observed by the photoelectric unit 24.

In the operation of the system as applied to processing data relating to decisions in law cases, if the question is "What cases together with their subsequent treatment, if any, in lateral decisions, and citations of the case, if any, in other cases or reports relate to the general authority of a trustee in bankruptcy in his administration of an estate," the question is put in coded form by the operator of the programmer. The input tape has the photographic track with microfilm prints of cases of State and Federal courts, such as those reported by a national reporting system. The cases may be printed on the film in sequential order, as found in the reports, or in any other convenient manner. The magnetic track adjacent the print of the case is coded to contain information relating to the contents and information found in the case or data concerning subsequent treatment or references to the case, if any. For example, if the caption of the case were:

IN RE TOWN CRIER BOTTLING CO.,
123 F. Supp. 588, relating to
Bankruptcy
Administration of Estate
246 Authority of Trustee in General, there would be coded in the magnetic track beside the print of the decision in the case the coded data BANKR 246; also the magnetic track would contain answer information similar to that furnished by a citator to indicate the present status or value of the decision, etc., and to locate subsequent cases involving the same principle of law, for instance, showing that the case had been cited in: 144 FS $509^3$ and 31 AL2 877 S. The coded answer data means the case in point has been cited in volume 144 of the Federal Supplement, page 509, paragraph 3, and in volume 31 of American Law Reports, Second Series, Supplement, at p. 877. The coded data on the track comprises two segments, i.e. that which will correspond to a question code, viz. BANKR 246, and that which will correspond to the answer of the question code, viz. 123 FS 588. See 144 FS $509^3$, $31AL^2$ 877S.

To insert the question in the programmer, the operator punches the keys of the programmer so that the code set up in the shift register is BANKR 246. The selector read-write unit 20 senses the code of the magnetic track of the tape and sends the code to the selector comparator which also receives from the shift register 38 the question code. If no similarity is developed in comparing the codes, no acceptance pulse is derived in the selector comparator, but if the code from the input tape is BANKR 246, and is from the magnetic track beside the photographic print of the above case, an acceptance pulse is derived in the selector comparator, and is passed to the computer memory and the synchronizer. The selector read-write unit passes the question code BANKR 246 and the answer code mentioned above to the computer memory and synchronizer, which produces a copy of the document selected from the input tape to the sensitized output tape in the manner described above.

In the computer memory the acceptance pulse may be used to energize a counter for producing a preset output pulse responsive to the number of frames between the sheets of a document on the input tape where the selected frames are not all together. The preset output pulse can then be used to reverse the input out output tape so that all the sheets may be reproduced on the output tape in adjacent frames. Also the computer memory may store the question-answer code from the magnetic track so that the computer memory may feed the codes to the magnetic track beside each duplicate print that is made.

The input tape is further read by the input read-write unit 20 to determine if other information exists on the input tape that corresponds to the question code BANKR 246 and if such question code is present on the input tape, the selector comparator, computer memory, and synchronizer again proceed to record the photographic data with its adjunct magnetic data, including the question-answer code, on the output tape in the manner described above.

Instances may arise where it is desired to change the question-answer code due to more recent or revised data than the data coded on the input tape. This is accomplished by the operator storing in the computer memory the changed or revised question-answer code so that the changed code is sent to the synchronizer and the output read-write unit 36 as well as to the modifying read-write unit 22 for correcting the output and input tapes to reflect the changed or revised data.

In the embodiment described the input tape is prepared for movement to be read in a single direction. It will be understood that an arrangement can be utilized wherein the input tape may move in either of two directions by providing additional selector and output read-write units positioned along the path of travel of the tapes between the lamp 26 and reels 14, 34 and connected into the circuit in lieu of the similar devices used in the forward direction by a switching device such as a flip-flop having its conditions controlled by the direction of the input tape. The reversal step in operating the drive mechanism for the input tape may be accomplished automatically by a control signal from the computer.

Also it will be understood that a multiple of input tapes disposed parallel to one another can be used and the output tapes on which the selected records from any portion of the multiple input tapes are made may be disposed substantially at right angles thereto to provide a larger capacity in searching and for faster access.

It is also to be understood that an alternative method of providing for simultaneous photographic files and magnetic tape movement, in order to circumvent the necessity of combining physically the photographic film and magnetic tape, is to mount the end portion of the film and tape in side-by-side arrangement on a multiple reel having two distinct compartments. In this manner, the movement of the magnetic tape by conventional means will cause similar control of the movement and stoppage of the photographic film.

The use of tapes having photographic and magnetic data or sensitive portions has been described specifically in connection with apparatus for processing data. However, the invention is of broader applicability and in general it is possible to use cards with similarly disposed features for storing alterable and unalterable data.

One of the more specific advantages of the system is that a series of frames on one tape may be selected and reproduced onto another tape in the same order or different order. Particularly in a case where it is desirable to assemble on an output tape several frames for selection that are remotely spaced on the master or input tape, it is possible by using logical machine devices similar to those shown in FIG. 4, to provide blank frames or spaces on the output tape until the remotely located frames are selected from the input tape and then to reselect the blank frames on the output tape by instructions from the computer memory concerning the number of frames that have to be turned back to the blank frames so that the selected frames of the input tape may be produced on the blank output tape frames.

A significant advantage of the invention is that the selected alterable and unalterable information is sorted, collated and edited. This means that a random array of frames having information on the photographic and magnetic tracks of the input media can be arranged on the output media according to set conditions programmed according to a distribution list or other logical pre-program-pattern for analysis, which in the foregoing description has been a sequential arrangement. It is possible by using similar logical machine elements to achieve any logically edited distribution or array of reproduced frames on the output tape. Also it is noted that the read-write data fed to the selective comparator may be either from the input tape or output tape. For instance, the question code may come directly from the output tape where it has been written in an earlier part of the recording operation.

It is apparent that the new data processing system may use microfilm tape having a magnetic track on each edge of the film tape so as to prevent lopsidedness of the tape film as it is stored on reels.

While preferred embodiments of the invention have been described, it is to be understood that various changes may be made in the details in the system of the invention herein described without departing from the invention or sacrificing any of the advantages thereof.

I claim:

1. An information retrieval and storage system comprising an input tape with a photographic track having photographic information and a magnetically coded track adjacent thereto having stored bits of information representing coded data thereon, a comparator means for comparing said bits of information, a magnetic read-write unit positioned proximate to the magnetic track of the tape and coupled to the comparator means to send bits thereto, means for moving the tape past the magnetic read-write unit for scanning thereby of the stored bits of information on the tape, a programming means coupled to the comparator device for transmitting thereto predetermined bits of information representing coded data, an output tape with a photographically-sensitive track and a magnetically sensitive track adjacent thereto for respectively receiving bits of information thereon, an output magnetic read-write unit positioned proximate to the magnetic track of the output tape, means for moving the output tape past the magnetic read-write unit, a lamp unit for producing a copy of the photographic information from the input tape onto the photo-sensitive track of the output tape and means coupled to the comparator means and to the driving means for the output tape, the lamp unit and the magnetic read-write unit, said last mentioned means being responsive to the simultaneous comparison by the comparator of bits of information on the input tape with bits of information of the programming means for energizing the driving means for the output tape, the lamp unit and the output magnetic read-write unit, whereby the output tape will have reproduced thereon the selected photographic information and the selected magnetic bits of information.

2. An information retrieval system comprising a programming means for developing bits of code in the form of pulses, an input tape having thereon photographic and magnetic forms of codes, an input magnetic read-write unit positioned near the tape for sensing the magnetic code on the tape, a selector comparator connected to the programming means for receiving bits of code therefrom for comparison with the bits of code, said selector comparator being coupled to the magnetic read-write unit and deriving a control pulse when the programming and magnetic codes are identical, an output tape having portions sensitive, respectively, for recording photographic and magnetic forms of information, an output magnetic read-write unit positioned adjacent the magnetically sensitive portion on the output tape for recording a code thereon, a lamp means for causing translation of selected photographic information from the input tape to the sensitive portions of the output tape in accordance with the said control pulse, a driving means for the input tape and a driving means for the output tape, and a synchronizing unit connected to the selector comparator and to the lamp for energizing the lamp to cause the output tape to be sensitized with selected photographic information stored on the input tape, said synchronizing unit being connected (1) to the input tape driving means to advance the input tape, (2) to the output tape driving means to advance the output tape, and (3) to the output read-write unit for impressing the programming code onto the output tape for storage thereon.

3. An information retrieval and storage system comprising a programming means for developing pulse code information representing a question, an input tape having a photographic form of information and a magnetic form of information thereon representing a question-answer code, an output tape having tracks that are respectively photographically and magnetically sensitive for selectively receiving photographic and magnetic forms of information, an input read-write unit adjacent the magnetically sensitive portion of the input tape, an output read-write unit adjacent the magnetically sensitive portion of the output tape, a code comparator coupled to the programming means and the input read-write unit for comparing coded information received respectively from programming means and from the input read-write unit, a computer-memory coupled to the code comparator for receiving an acceptance pulse therefrom when the coded information from the programming means and the input unit are identical, a synchronizer unit coupled to the programming means and the computer-memory for receiving selected information and the acceptance pulse from the programming means and the computer-memory respectively, a lamp coupled to the synchronizer unit for causing translation of photographic information from the input tape to the output tape responsive to energization thereof by the acceptance pulse received in the synchronizer unit, a driving means for the input tape for providing movement of the input tape, an output tape driving means coupled to the synchronizer unit and responsive to the acceptance pulse received therefrom for moving the output tape, said output read-write unit being coupled to the synchronizer for recording the coded information received by the synchronizer from the input tape onto the magnetically sensitive portion of the output tape in response to the acceptance pulse received in the synchronizer unit.

4. An information retrieval system comprising a shift register for storing coded data representative of interrogatory information, a data storage tape having stored thereon predetermined coded data together with related unalterable reference data, an input read-write unit positioned adjacent the data storage tape for receiving the predetermined coded data from the data storage tape, a selector comparator means coupled to the shift register and the input read-write unit, respectively, for comparing the interrogatory coded data with the predetermined coded data, including means for developing an acceptance pulse where the said forms of coded data are identical, an output read-write unit coupled to the selector comparator for translating to a sensitized tape the coded data from the storage tape in response to the acceptance pulse in the selected comparator, a lamp unit coupled to the selector comparator for transferring the unalterable reference data from the data storage tape to the sensitive tape in response to the acceptance pulse in the selector comparator, a driving means for the sensitized tape, means coupling the sensitized tape driving means to the selector comparator to move the sensitized tape in response to the acceptance pulse in the selector comparator, and computer-memory means coupling the computer-memory to the selector comparator for developing pulses representative of the number of copies to be prepared on the sensitized tape in response to the acceptance pulse, driving means for the data storage tape, said data storage tape driving means being coupled to the selector comparator to move the data storage tape in the absence of an acceptance pulse from the selector comparator, said data storage tape driving means being de-energized from moving the data storage tape on the reception of an acceptance pulse, so that multiple copies of the unalterable reference data on the data storage tape are reproduced.

5. A data processing system comprising a shift register for storing question data, an input read-write unit for receiving alterable data from a medium disposed to move in a first direction, which medium has stored thereon alterable and unalterable data, means for comparing the question data with the alterable data, received by the input read-write unit, means coupled to the shift register and the input read-write unit for developing an acceptance pulse responsive to receiving question data identical with the alterable data, an output read-write unit coupled to the developing means for transferring the question data in response to the acceptance pulse of the comparing means to an output medium disposed to move in a direction substantially identical with the first direction, a lamp unit coupled to the developing means for sensitizing the output medium responsive to its energization by the acceptance pulse, and a predetermined counter coupled to the developing means in response to the acceptance pulse to control the number of copies of alterable and unalterable data that are reproduced on the output medium.

6. An informaton retrieval system comprising an input read-write unit for sensing alterable data on a moving input tape, a programmer for storing data similar in form to the alterable-data, a comparator means coupled to the input read-write unit and the programmer for comparing alterable data from the moving input tape with the data stored in the programmer, including means for developing an acceptance pulse when both of the data are identical to each other, the alterable data including an answer code, a portion of which code has information as to a selected number of sheets of unalterable data on the input tape relating to the answer code, a lamp coupled to the comparator means for causing reproduction of the selected number of sheets of unalterable data of the input tape upon a sensitized output tape, a "number of sheets" counter coupled to the input read-write unit, said "number of sheets" counter being preset by said portion of the answer code having information as to the selected number of sheets of unalterable data on the input tape for counting the selected number of sheets of unalterable data, a "number of copies" counter coupled to the programmer, said "number of copies" counter being preset by data stored in the programmer for counting a preset output pulse from the "number of sheets" counter for each copy of unalterable data reproduced, a cycling circuit connected to the comparator means, to the "number of sheets" counter and to the lamp, said cycling circuit being actuated by the acceptance pulse to (1) transmit pulses to the "number of sheets" counter to step said counter, and (2) energize the lamp for causing reproduction of the selected number of sheets of unalterable data of the input tape upon said sensitized output tape, means coupled to the input tape read-write unit to record the alterable data received from the input tape substantially simultaneously as the unalterable data is being reproduced, and signal means coupled to "the number of copies" counter and the cycling circuit and responsive to a pre-set output pulse of the "number of copies" counter to stop the transmission of pulses in the cycling circuit.

7. The information retrieval system of claim 6 having an input tape driving means being coupled to the comparator means and to the "number of copies" counter for moving the input tape when there is no acceptance pulse produced in the comparator means and when a preset output pulse is produced by the "number of copies" counter, and an output tape drive means coupled to the cycling circuit for advancing said sensitized tape for receiving in reproduced form the alterable and unalterable data from the input tape as the pulses are produced in the cycling circuit.

8. An information retrieval system comprising a shift register for storing coded data representative of interrogatory information, a data storage tape having stored thereon predetermined coded data together with related unalterable reference data, an input read-write unit positioned adjacent the data storage tape for receiving the predetermined coded data from the data storage tape, a selector comparator means coupled to the shift register and the input read-write unit, respectively, for comparing the interrogatory coded data with the predetermined coded data, including means for developing an acceptance pulse where the said forms of coded data are identical, an output read-write unit coupled to the selector comparator for translating to a sensitized tape the coded data from the shift register in response to the acceptance pulse in the selector comparator, a lamp unit coupled to the selector comparator for transferring the unalterable reference data from the data storage tape to the sensitive tape in response to the acceptance pulse in the selector comparator, a driving means for the sensitive tape, means coupling the sensitive tape driving means to the selector comparator to move the sensitive tape in response to the acceptance pulse in the selector comparator, and computer-memory means coupling the computer-memory to the selector comparator for developing pulses representative of the number of copies to be prepared on the sensitive tape in response to the acceptance pulse, driving means for the data storage tape, said data storage tape driving means being coupled to the selector comparator to move the data storage tape in the absence of acceptance pulses from the selector comparator, said data storage tape driving means being de-energized from moving the data storage tape on the reception of an acceptance pulse, so that multiple copies of the unalterable reference data on the data storage tape are reproduced.

References Cited in the file of this patent

UNITED STATES PATENTS

| | | |
|---|---|---|
| 2,295,000 | Morse | Sept. 8, 1942 |
| 2,782,398 | West | Feb. 19, 1957 |
| 2,785,388 | McWhirter | Mar. 12, 1957 |
| 2,885,659 | Spielberg | May 5, 1959 |
| 2,959,351 | Hamilton | Nov. 8, 1960 |

OTHER REFERENCES

Publication: "Theory of Files," by Lionello Lombardi, Proceedings of the Eastern Joint Computer Conference, pp. 137–141, Dec. 13–15, 1960.

Publication: BRL Report No. 1115, A Third Survey of Domestic Electronic Digital Computing Systems by M. H. Weik, March 1961, page 370 relied on.

Publication: Programming the IBM 650 Magnetic Drum Computer and Data Processing Machine, by Richard V. Andree, Holt Rinehart and Winston Inc., Publishers (copyright 1958).